INVENTOR
W. L. BOND
BY
Richard H. Bryer
ATTORNEY

3,265,528
METHOD OF FORMING METAL CARBIDE COATING ON CARBON BASE

Walter L. Bond, Berkeley Heights, N.J., assignor to Bell Telephone Laboratories, Incorporated, New York, N.Y., a corporation of New York
Filed Mar. 27, 1963, Ser. No. 268,325
7 Claims. (Cl. 117—95)

This invention relates to apparatus suitable for silicon evaporation, to methods for making such apparatus, and further to methods for evaporating silicon utilizing such apparatus.

The advantageous use of evaporated silicon layers as optical interference films is well-recognized in the art, for example as described by L. Holland in "Vacuum Deposition of Thin Films," 1956 edition. As described in United States patent application Serial No. 203,514, filed June 19, 1962, now abandoned evaporated silicon films are also of particular utility in epitaxial growth processes involving the epitaxial growth of silicon films on semiconductor substrates.

The evaporation of silicon is recognized to be difficult, however. As noted on page 489 of the aforementioned book by L. Holland, silicon cannot be satisfactorily evaporated from conventional refractory metal containers because of alloy formation when silicon is raised to its melting point. The resulting volatile alloys cause contamination of the deposited silicon layer. Carbon also reacts with silicon to form silicon carbide, which is very soluble in silicon. Since the vapor pressure of silicon carbide is comparable to that of silicon, evaporated silicon layers are accordingly contaminated with silicon carbide.

In accordance with the present invention, there is described a carbon container having an inner protective coating which prevents contamination of evaporated silicon layers. More particularly, in accordance with the invention a continuous film of a metal carbide impervious to attack by molten silicon is formed on the interior surface of a carbon container. Formation of the film is achieved by utilizing a silicon flux which promotes reaction between the carbon container and at least one metal selected from the group consisting of tantalum, niobium, tungsten, hafnium, molybdenum, and vanadium.

In contrast to the high volatility of silicon carbide and silicon-metal alloys, the metal carbide films of the invention are not volatile under conventional silicon evaporation conditions. Further, the metal carbide films are impervious to attack by molten silicon, thereby preventing reaction between the silicon and the underlying carbon container. Evaporation from carbon containers so protected accordingly proceeds with a minimum degree of contamination of deposited silicon layers.

The invention may be more easily understood by reference to the drawing, in which.

Figure 1:
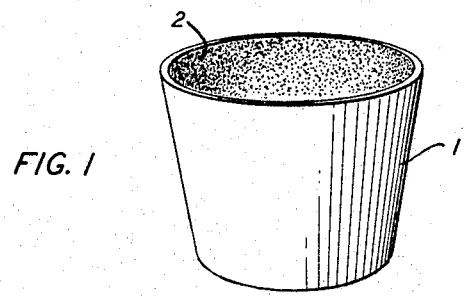
FIG. 1 is a perspective view of a carbon container of the invention.

Referring more particularly to FIG. 1, there is shown a carbon crucible 1 having a continuous metal carbide coating 2 on the inner surface thereof. It has been determined that a continuous carbide film results for minimum metal carbide film thickness in the order of 0.1 mil. Since this thickness adequately protects the underlying carbon surface from corrosive attack, no particular advantage accrues from forming thicker films. It is understood, however, that film thicknesses in excess of 0.1 mil are not otherwise undesirable. In general, films thicker than 5 mils are difficult to form due to the difficulty encountered in reacting the underlying carbon layer with the metal. The following Table I sets forth the amount of metal required to form a 0.1 and 5 mil thick metal carbide film on the carbon surface.

Table I

| Metal | Milligrams per Square Centimeter of Carbon Surface | |
|---|---|---|
| | 0.1 Mil Thick | 5 Mils Thick |
| Tantalum | 3.5 | 176 |
| Niobium | 2 | 104.5 |
| Tungsten | 4 | 200 |
| Hafnium | 2 | 104.5 |
| Molybdenum | 2 | 107 |
| Vanadium | 1.3 | 68.8 |

To promote reaction between the carbon container and the metal and to ensure good wetting of the interior container surface by the resulting metal carbide film, an amount by weight of silicon at least one-quarter the amount of metal used is required. Desirably, the amount of silicon utilized is equal to or up to twice the amount of metal used. Amounts of silicon up to ten times the amount of metal used are permissible, however.

The initial mixture in the container is composed of elemental metal and silicon or metallic and silicon compounds that revert to the elemental materials under the processing conditions detailed herein. When in the form of compounds, it is necessary that the by-products of the reaction volatilize during heating, thereby preventing such by-products from acting as contaminants during subsequent silicon evaporation from the container. Illustrative of such compounds are silicon tetrachloride and metal halides.

The container and the silicon-metal mixture undergo a controlled heat treatment to form the previously discussed metal carbide film and to volatilize the silicon utilized to proomte such film formation. Volatilization of substantially all of the silicon ensures that subsequent silicon evaporations from the processed container result in a minimum amount of silicon carbide contamination of the formed layers.

To prevent impurity contamination of the metal carbide film formed on the container surface, the heat treatment is conducted in an inert atmosphere, for example neon, nitrogen, and the like. For the purposes of the invention, inert atmospheres are also understood to include a vacuum of $10^{-4}$ to $10^{-6}$ millimeters of mercury. Such atmospheres contain sufficiently few reactive atoms as to essentially preclude contamination of films formed therein. As a precaution against oxide formation, it is considered desirable to cool the heat-treated container to room temperature in the inert atmosphere used in the heating step.

The dual objectives of forming a metal carbide film and volatilizing the silicon are advantageously accomplished by either a single or two-stage heat treatment. Both treatments utilize a heating schedule that melts and reacts the mixture with the carbon surface at temperatures less than those at which silicon evaporation proceeds so rapidly as to impede formation of a continuous metal carbide film. The minimum temperature of the heating schedule necessary to melt the mixture is 1450° C. This temperature is also sufficient to react the melt with the carbon surface. A satisfactory maximum temperature at which silicon evaporation does not interfere with film growth is 3000° C. at atmospheric pressure and 2500° C. in a vacuum of $10^{-4}$ to $10^{-6}$ millimeters of mercury. To form the metal carbide film, it is only necessary to be within the designated temperature range for a brief period sometime during the heating cycle. Exemplary periods are up to three minutes for the lower ranges of temperature and about one-half minute for the higher ranges of temperature. The particular time necessary to wet the interior container surface is readily determinable by visual inspection. Although permissible, no particular advantage accrues to longer heating periods.

In accordance with the single stage heat treatment the temperatures utilized to promote film formation also effect removal of this silicon by volatilization. Since, as previously discussed, these temperatures are designed to prevent to rapid a silicon evaporation rate, the lower ranges of temperature require a relatively long period of time to effect silicon removal. The minimum temperature of 1450° C., for example, requires up to two hours to effect silicon removal. Accordingly, a higher range of temperatures within the heating schedule is preferred. Minimum temperatures in the order of 2500° C. at atmospheric pressure and 2000° C. in a vacuum of $10^{-4}$ to $10^{-6}$ millimeters of mercury are considered particularly advantageous since the silicon removal is accomplished at these temperatures within the same time period necessary to form the metal carbide film.

In accordance with the two-stage heat treatment, temperatures higher than those initially used to promote film growth are utilized to facilitate silicon removal. Preferably, temperatures of at least 2500° C. at atmospheric pressure and 2000° C. in a vacuum of $10^{-4}$ to $10^{-6}$ millimeters of mercury are utilized. The maximum temperatures used in this step are limited by the temperatures at which significant evaporation of the formed metal carbide film occurs. These maximum temperatures are about 200° C. less than the boiling point temperature of the films. The lowest such maximum temperature associated with the metal carbide films of the invention is about 3700° C. in a vacuum of $10^{-4}$ to $10^{-6}$ millimeters of mercury for the formed vanadium carbide film. Based on equipment limitations, this temperature is in general a practical maximum temperature for all films of the invention. It is understood, however, that higher temperatures commensurate with the preceding discussion are feasible. To remove silicon by volatilization, it is only necessary to be within the designated temperature range for a brief period. An exemplary period is up to two minutes. Although permissible, no particular advantage accrues to longer heating periods.

A specific example of one procedure for making a coated carbon container of the invention is as follows: For the purposes of this example, a conventional vapor source configuration consisting of a graphite bar with a trough therein was utilized. The bar was 2½ inches long and ¼ inch in diameter, with the trough being 1¾ inches long and $\frac{1}{16}$ inch deep. It is understood that other carbon container configurations, for example, such as those disclosed on page 133 of the aforementioned book by L. Holland, are equally amenable to processing by the methods of the invention.

The trough was loaded with 150 milligrams of tungsten and 200 milligrams of silicon. The bar was then placed in a standard vacuum chamber and a residual atmosphere of approximately $10^{-5}$ millimeters of mercury was established. By means of Joule heating, the silicon and tungsten mixture was raised to and heated at a temperature of 1500° C. for three minutes. At the end of this period, a continuous tungsten carbide film was formed on the interior surface of the trough. The temperature was then raised to 2000° C. for two minutes to remove the silicon by volatilization. The bar was then cooled to approximately room temperature and removed from the chamber.

Figure 2:
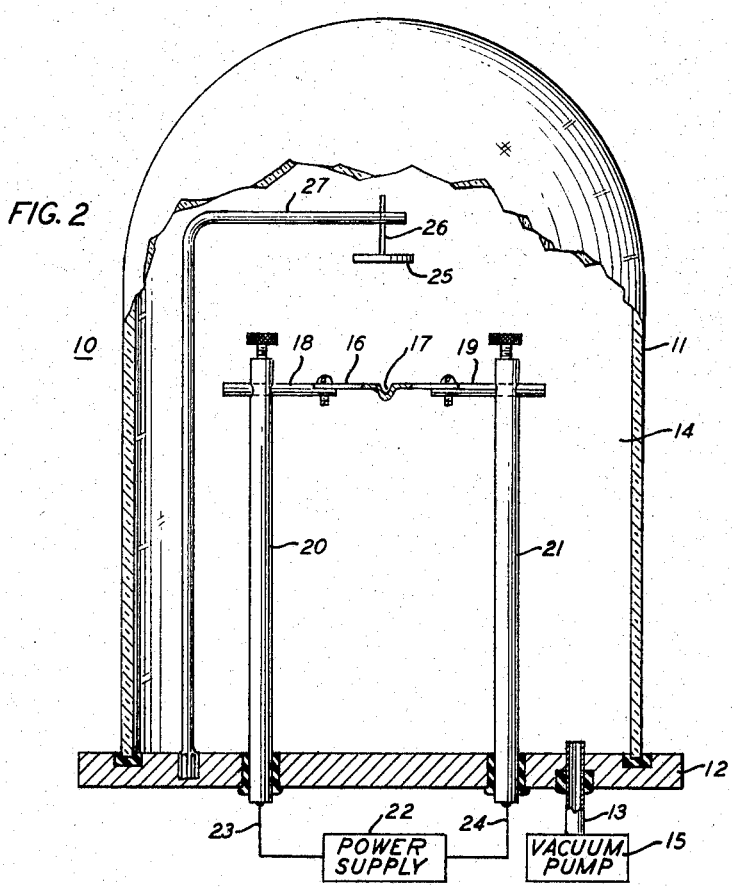
FIG. 2 is a sectional view of a typical silicon deposition apparatus utilizing a carbon container of the invention.

FIG. 2 shows a typical silicon vacuum deposition apparatus 10 utilizing a container of the invention to hold silicon source material. Apparaus 10 is defined by bell jar 11 and base member 12. Port 13 communicates with vacuum chamber 14 and is attached to vacuum pump 15.

Positioned within vacuum chamber 14 is a graphite bar 16 having indentation 17 lined with a metal carbide film of the invention for holding silicon source material. Bar 16 is supported by electrodes 18 and 19, which in turn are held by supports 20 and 21, respectively. These supports extend through and are insulated from base member 12 and make electrical contact with power supply 22 through leads 23 and 24. Substrate 25 is positioned and supported over bar 16 by arm 26 attached to support 27.

The parameters governing the vacuum deposition of silicon are well known and are not considered part of the instant invention. Suitable substrate materials, substrate temperatures, evaporation rates, and vacuum deposition apparatus configurations, for example, are set forth in the previously noted book by L. Holland. In general, vapor deposition is done under vacuums of $10^{-5}$ to $10^{-6}$ millimeters of mercury. Commensurate with the art, the deposition of silicon onto many substrates maintained at elevated temperatures, for example glass at 300° C., ensures the formation of hard films. Silicon evaporation temperatures in the illustrative range of 1800° C. to 2500° C. are typically utilized. The lower temperature ensures an adequate evaporation rate. The higher temperature is sufficiently less than the boiling point of silicon as to prevent the violent liberation of any included gases therein. Resistance or induction heating of the container holding the silicon source material is typically utilized to effect silicon evaporation.

In one exemplary silicon deposition procedure, the trough of the previously described treated bar was loaded with 300 milligrams of silicon. The bar was then placed in a vacuum chamber similar to that depicted by FIG. 10.4, page 306, of L. Holland's book. A 3-inch by 1-inch glass substrate was positioned several inches above the bar and a residual atmosphere of approximately $10^{-5}$ millimeters of mercury was established in the chamber. The glass substrate was heated to 300° C. and the bar was heated to 1800° C. Evaporation continued for two minutes. At the end of this period, the substrate was cooled to room temperature and removed from the chamber. The high purity of the evaporated film was indicated by its highly metallic appearance.

While specific embodiments of the invention have been shown and described, it is understood that they are but illustrative and that various modifications may be made therein without departing from the scope and spirit of the invention as defined by the appended claims.

What is claimed is:

1. A method for making a carbon container substantially inert to molten silicon comprising the steps of forming a mixture in said container of silicon and at least one metal selected from the group consisting of tantalum, niobium, tungsten, hafnium, molybdenum and vanadium, said metal being present in an amount sufficient to form with the carbon a metal carbide film at least 0.1 mil thick on the interior container surface and said silicon being present in an amount by weight of from one-quarter to ten times the amount of metal present and subjecting said container to a heating schedule in an inert atmosphere that melts and reacts the mixture with the carbon surface to form a metal carbide film and removes the silicon by volatilization, the maximum temperature of said schedule for forming the metal carbide film being in the order of 3000° C. at atmospheric pressure and 2500° C. in a vacuum of $10^{-4}$ to $10^{-6}$ millimeters of mercury and the maximum temperature of said schedule for volatilizing the silicon being in the order of 200° C. below the boiling point of the metal carbide film.

2. The method in accordance with claim 1 wherein the minimum temperature of said heating schedule is 1450° C. and the maximum temperature of said schedule for volatilizing the silicon is 3700° C. in a vacuum of $10^{-4}$ to $10^{-6}$ millimeters of mercury.

3. A method for making a carbon container substantially inert to molten silicon comprising the steps of forming a mixture in said container of silicon and at least one metal selected from the group consisting of tantalum, niobium, tungsten, hafnium, molybdenum, and vanadium, said metal being present in an amount sufficient to form with the carbon a metal carbide film at least 0.1 mil thick on the interior container surface and said silicon being present in an amount of from one-quarter to ten times the amount of metal present, initially heating said container in an inert atmosphere at a minimum temperature of 1450° C. to a maximum temperature of 2500° C. in a vacuum of $10^{-4}$ to $10^{-6}$ millimeters of mercury and 3000° C. at atmospheric pressure to cause wetting of the interior container surface by the metal carbide film and further heating said container in said atmosphere at a minimum temperature higher than the temperature utilized in said initial heating step up to a maximum temperature 200° C. below the boiling point of said metal carbide film to remove silicon by volatilization.

4. The method in accordance with claim 3 wherein said further heating is conducted at a minimum temperature of 2500° C. at atmospheric pressure and 2000° C. in a vacuum of $10^{-4}$ to $10^{-6}$ millimeters of mercury.

5. The method in accordance with claim 4 wherein the said maximum temperature utilized to remove silicon is 3700° C. in a vacuum of $10^{-4}$ to $10^{-6}$ millimeters of mercury.

6. A method for making a carbon container substantially inert to molten silicon comprising the steps of forming a mixture in said container of silicon and at least one metal selected from the group consisting of tantalum, niobium, tungsten, hafnium, molybdenum, and vanadium, said metal being present in an amount sufficient to form with the carbon a metal carbide film at least 0.1 mil thick on the interior container surface and said silicon being present in an amount of from one-quarter to ten times the amount of metal present, and heating said container in an inert atmosphere at a minimum temperature of 1450° C. to a maximum temperature of 2500° C. in a vacuum of $10^{-4}$ to $10^{-6}$ millimeters of mercury and 3000° C. at atmospheric pressure to cause wetting of the interior container surface by the metal carbide film and remove the silicon by volatilization.

7. The method in accordance with claim 6 wherein the minimum temperature is 2000° C. in a vacuum of $10^{-4}$ to $10^{-6}$ millimeters of mercury and 2500° C. at atmospheric pressure.

References Cited by the Examiner

UNITED STATES PATENTS

| | | | |
|---|---|---|---|
| 2,929,741 | 3/1960 | Steinberg | 117—118 X |
| 2,978,358 | 4/1961 | Campbell | 117—106 |
| 3,047,424 | 7/1962 | Suchoff | 118—49.1 X |
| 3,065,088 | 11/1962 | Janes et al. | 117—118 X |
| 3,095,316 | 6/1963 | Hartwig | 117—106 X |
| 3,120,453 | 2/1964 | Fitzer et al. | 117—228 X |
| 3,151,852 | 10/1964 | Weech et al. | 117—106 X |

OTHER REFERENCES

Holland: Vacuum Deposition of Thin Films, 1956, pp. 489–490 relied on.

MURRAY KATZ, *Primary Examiner.*

RICHARD D. NEVIUS, *Examiner.*

A. GOLIAN, *Assistant Examiner.*